BEST AVAILABLE COPY

UNITED STATES PATENT OFFICE.

WILLIAM E. ANDREW, OF NEW YORK, N. Y.

IMPROVEMENT IN PROCESSES OF RENDERING ANIMAL FATS.

Specification forming part of Letters Patent No. 153,999, dated August 11, 1874; reissue No. 6,727, dated November 16, 1875; application filed November 8, 1875.

*To all whom it may concern:*

Be it known that I, WILLIAM E. ANDREW, of the city, county, and State of New York, have invented a new Process for Rendering Animal Fats, and that the following is a specification of the same:

My invention relates to certain improvements in the art of rendering fat, &c., from the fats of animals, whereby a superior article is produced.

I have found, in experimenting, that when fat is rendered in the customary manner, such as in jacketed kettles, or in water, that fermentation is likely to ensue, as well as the liability of only a partial separation of the fat from the tissue or membrane, and a great loss of time and material is the general result of such treatment.

I have also discovered that rendering in jacketed kettles or over a fire is objectionable, inasmuch as the result of such treatment is the irregular and uneven application of heat, which renders the material in question liable to be scorched.

In the usual methods of rendering animal fats, water is in contact with it during the treatment, and the rendered fats with more or less water are left in contact with the membrane (cracklings or scrap) for some time.

Now, my invention consists in applying dry heat, with pressure, to separate the liquefied portion, and then to remove the liquid fats as fast as separated.

When practicable, it is desirable to commence the process of rendering before the animal fat has lost any considerable portion of its animal heat. If the fat is wet, it must be previously dried before the process of rendering begins. Elaine, or the liquid portions of the fat, when used for domestic purposes, must be pure, sweet, and free from animal odor or flavor, or the odor of ordinary tallow, and in order to avoid these objections, and to accomplish desirable results, I employ the following methods, viz.: The rapid rendering of the fat at a high degree of dry heat, such as may be produced in any convenient manner, and then conveying the liquid fat away from the heat as fast as it is eliminated, and avoid the usual method of allowing the same, when liquefied, to remain in contact with the heat, membrane, tissue, or animal matter, while undergoing the process of rendering.

In carrying out my invention, I take fresh, dry animal fat, chop, or hash it fine, in any convenient manner, in a room at a temperature sufficient to start the oil. As fast as the fat is warmed and rendered soft it is packed into bags or cloths, placed in a press between plates, in series, and a little apart from each other, in order that the dry heat used in this process may pass freely between and among them. The bags being of open texture, allow the dry heat to penetrate through them and through the fat contained therein. The press should be supplied or provided with a suitable jacket, and the dry heat used in the process is confined to the fats being rendered. The temperature within the jacket should be about 140° Fahrenheit—the higher the temperature the more rapid the yield.

The fat, after having been packed in the press, as before mentioned, the doors of the jacket are closed, the heat applied, and a sufficient pressure given. The press should be provided with suitable troughs or carriers, in order that the product may be conveyed away from the heated apartment as rapidly as rendered, to a cooler place where it becomes a thick mass, the membrane and tissue remaining in the bags.

I have also discovered that if the fats remain heated any considerable time, in a mass, before the liquid fat is separated from the membrane or tissue, the elaine produced will have a disagreeable animal odor or flavor. I obviate this by conveying the liquid fats away from the heat, membrane, and tissue as rapidly as they become liquid.

The product, cooled as described, is then placed in other bags or cloths, and packed in a press, between plates, in a room the temperature of which should be about 85° Fahrenheit, and subjected to pressure, as before, by which means the elaine is separated from the stearine, which remains in the press. The lower temperatures are preferred for the production of the finest grades of elaine, as it will contain less stearine than if obtained at the higher temperatures.

Thus, as is obvious, each element of the animal fat is effectually separated from the others, with all deleterious matters eliminated, and the elaine, which is the valuable product sought, may be used in the manufacture of a substitute for butter.

What I claim is—

1. The process, herein described, for rendering fats, consisting in the application of dry heat or dry hot air to liquefy, and pressure to separate, the oily portion from the membrane, and removing the liquid portions from contact with the membranous portions as fast as separated.

2. The within-described process of separating the elaine and stearine from the membrane of animal fat, consisting in subjecting the fat to pressure when raised to a sufficient temperature by dry heat to effect the separation, and conveying the oily product away from the heat to a cooler place, as soon as expressed, as and for the purposes specified.

3. In extracting elaine from animal fat for food or culinary purposes, the process of separating the elaine and stearine from the membrane, by taking the fat while it retains its animal heat, and subjecting it to heat and pressure, as specified.

WILLIAM E. ANDREW.

Witnesses:
H. CLAY SMITH,
CHAS. L. COOMBS.